US012691997B2

(12) United States Patent
Amargier et al.

(10) Patent No.: US 12,691,997 B2
(45) Date of Patent: Jul. 28, 2026

(54) PROPELLER PROPULSION SYSTEM FOR AIRCRAFT INCLUDING MEANS FOR ADJUSTING THE BLADE ANGLE OF THE BLADES OF THE PROPELLER AND AIRCRAFT INCLUDING SUCH A PROPULSION SYSTEM

(71) Applicant: Airbus Operations SAS, Toulouse (FR)

(72) Inventors: Rémi Amargier, Toulouse (FR);
Mathieu Mahe, Toulouse (FR);
Matthieu Scherrer, Toulouse (FR);
Cédric Paquet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/327,316

(22) Filed: Sep. 12, 2025

(65) Prior Publication Data

US 2026/0084805 A1     Mar. 26, 2026

(30) Foreign Application Priority Data

Sep. 24, 2024   (FR) ................................. FR2410200

(51) Int. Cl.
*B64C 11/30*      (2006.01)
*B64C 11/00*      (2006.01)
*B64C 11/32*      (2006.01)
(52) U.S. Cl.
CPC .......... *B64C 11/325* (2013.01); *B64C 11/008* (2013.01)

(58) Field of Classification Search
CPC ...... B64C 11/30; B64C 11/325; B64C 11/008
See application file for complete search history.

(56) References Cited

U.S. PATENT DOCUMENTS

| | | | |
|---|---|---|---|
| 7,037,072 B2 | 5/2006 | Carson | |
| 2014/0322016 A1 | 10/2014 | Tajan et al. | |
| 2018/0370626 A1 * | 12/2018 | Zachary | B64U 30/10 |
| 2023/0249812 A1 | 8/2023 | Besse et al. | |

FOREIGN PATENT DOCUMENTS

| | | | |
|---|---|---|---|
| CA | 3024684 A1 | 11/2017 | |
| DE | 19841853 B4 | 6/2007 | |
| EP | 1153828 A2 * | 11/2001 | B64C 27/605 |
| FR | 3005096 A1 | 10/2014 | |
| WO | 2021255373 A1 | 12/2021 | |

OTHER PUBLICATIONS

French Search Report for corresponding French Patent Application No. 2410200 dated Feb. 24, 2025.

* cited by examiner

*Primary Examiner* — Sabbir Hasan
(74) *Attorney, Agent, or Firm* — Greer, Burns & Crain, Ltd.

(57)     ABSTRACT
A propulsion system for aircraft having a longitudinal axis and including: a propeller mobile in rotation around the longitudinal axis and including a plurality of blades distributed angularly relative to the longitudinal axis. A blade angle of the blades may be adjusted to modify the blade angle of each blade as a function of the angular position of each blade around the longitudinal axis.

10 Claims, 8 Drawing Sheets

PROPELLER PROPULSION SYSTEM FOR AIRCRAFT INCLUDING MEANS FOR ADJUSTING THE BLADE ANGLE OF THE BLADES OF THE PROPELLER AND AIRCRAFT INCLUDING SUCH A PROPULSION SYSTEM

CROSS-REFERENCES TO RELATED APPLICATIONS

This application claims the benefit of French Patent Application Number FR2410200 filed on Sep. 24, 2024, the entire disclosure of which is incorporated herein by way of reference.

FIELD OF THE INVENTION

The present invention concerns a propeller propulsion system for aircraft including means for adjusting the blade angle of the blades of the propeller. Such adjustments enable adjustment of the pitch of each blade of a propeller as a function of the position of the blade during rotation of the propeller. The invention also concerns an aircraft including at least one such propulsion system.

BACKGROUND OF THE INVENTION

In propeller propulsion systems for aircraft it is known to adjust the pitch of the blades of the propeller during the various phases of a flight. In fact, modification of the pitch of the blades of the propeller enables adjustment of the thrust of the propulsion system as a function of the various flight phases of the aircraft. For example, it is possible to modify the pitch of the blades between the take-off phase and the phase of horizontal flight at constant speed (known as the cruising phase).

To this end, the propulsion system usually includes a system for controlling the pitch of the blades of the propeller of an aircraft designed to modify uniformly the blade angle of all the blades. Thus the same blade angle variation is applied to all the blades whatever the angular position of the blades relative to a longitudinal axis of the propulsion system about which the propeller turns.

Now, high distortions of the flow entering the front of the propeller are observed during the various flight phases. Although it is furthermore known to incline the propulsion system to manage the distortion of the flow of air entering the front of the propeller, this solution is effective only for a given flight condition, namely the cruising phase. The prior art solutions are therefore not the optimum for other flight phases of the aircraft, in particular the take-off phase.

In fact, during the take-off phase there continues to be distortion of the flow of air entering the front of the propeller. This results in a non-axisymmetrical incoming flow seen by the propeller and therefore a non-axisymmetric load on each blade, which represents a high impact on the levels of noise and the directionality of the aircraft. In particular, the ascending and descending blades do not experience the same local angle of attack and therefore do not produce the same loads. This load difference of the ascending and descending blades leads to an increase in the static loads at the level of the aircraft and the vibrational loads at the level of the blades. In particular on the ground the descending blade generates a high level of noise.

It is therefore necessary to provide a solution for adjustment of the blade angle of the blades of a propeller of a propulsion system for aircraft that enables modification of the pitch of the blades of the propeller so as to optimize the load produced by each blade and to limit the noise generated by the propeller.

SUMMARY OF THE INVENTION

An object of the present invention is to propose a propeller propulsion system for aircraft that enables optimum adjustment of the blade angle of the blades of the propeller.

To this end there is proposed a propulsion system for aircraft having a longitudinal axis and including:

a propeller mobile in rotation around said longitudinal axis, said propeller including a plurality of blades each having a blade axis globally perpendicular to the longitudinal axis, said blades being distributed angularly relative to said longitudinal axis; and first means for adjustment of the blade angle of said blades, said first adjustment means being configured to modify the blade angle of each blade as a function of the angular position of each blade around said longitudinal axis.

Such a propulsion system enables cyclic adjustment (that is to say adjustment that is repeated on each rotation of the propeller) of the blade angle of each blade as a function of its angular position around the longitudinal axis. Such cyclic adjustment enables adaptation of the blade angle of the blades during a complete rotation of the propeller about the longitudinal axis so that the propeller is able to provide an optimum thrust on the blades whatever the flight phase of the aircraft. Furthermore, such adjustment of the blade angle of the blades as a function of their angular position around the longitudinal axis enables a different blade angle to be imparted to the ascending blades and to the descending blades, with the aim of adapting the load applied to each blade of the propeller and thus to reduce the impact of the distortion of the flow entering the front of the propeller during the take-off phase. This enables great reduction of the noise generated by the propeller during this flight phase.

In order to modify the blade angle of each blade as a function of the angular position of each blade around said longitudinal axis said first adjustment means advantageously include a globally tubular roller globally coaxial with said longitudinal axis, said roller including on an external surface a housing configured to receive the roots of said blades, said housing extending in a first plane the non-zero angle of which relative to a plane perpendicular to a reference plane containing said longitudinal axis is between $-15°$ and $+15°$.

In a first embodiment of the invention said roller is fixed in rotation around said longitudinal axis and said housing takes the form of a groove globally extending in said first plane, said roots of said blades are received in said groove so that said blades pivot around said roller and around said longitudinal axis, and the angle of said first plane relative to said perpendicular plane is fixed, non-zero and between $-15°$ and $+15°$.

In a second embodiment of the invention said roller is fixed in rotation around said longitudinal axis and said housing takes the form of a groove extending globally in said first plane, said roots of said blades are received in said groove so that said blades pivot around said roller and around said longitudinal axis, and said first adjustment means are configured to modify the angle of said first plane relative to said perpendicular plane between $-15°$ and $+15°$.

According to one particular aspect of this second embodiment said first adjustment means include a transfer tube globally coaxial with said longitudinal axis, said roller is mounted on and mobile in rotation on said transfer tube around a rotation axis perpendicular to said longitudinal axis, said transfer tube includes a first actuator including a first actuator chamber delimited by walls of said transfer tube and a first actuator piston received in said first actuator chamber and mobile in translation along said longitudinal axis in said first actuator chamber, and a free end of said first actuator piston is connected by a first link to said roller so as to cause said roller to pivot relative to said transfer tube around said rotation axis and to modify the angle of said first plane relative to said perpendicular plane.

In a third embodiment of the invention said roller is mobile in rotation around said longitudinal axis and said housing takes the form of a plurality of individual housings extending globally in said first plane, a root of each blade is received in one of said housings so that said blades pivot with said roller around said longitudinal axis, and said first adjustment means are configured to modify the angle of said first plane relative to said perpendicular plane between −15° and +15°.

According to a particular aspect of this third embodiment said first adjustment means further include a transfer tube mobile in rotation around said longitudinal axis, said roller is mobile in rotation around said longitudinal axis and mounted on and mobile in rotation on said transfer tube around a rotation axis perpendicular to said longitudinal axis, said first adjustment means further include an auxiliary transfer tube fixed in rotation relative to said longitudinal axis and coaxial with said transfer tube, said transfer tube is mobile in rotation around said longitudinal axis inside said auxiliary transfer tube, said auxiliary transfer tube includes a second actuator including a second actuator chamber delimited by walls of said auxiliary transfer tube and a second actuator piston received in said second actuator chamber and mobile in translation in said second actuator chamber, and a free end of said second actuator piston is connected by a second link to said roller so as to cause said roller to pivot relative to said transfer tube around said rotation axis and to modify the angle of said first plane relative to said perpendicular plane.

According to another particular aspect of this third embodiment said roller has a lateral face globally parallel to said first plane and said first adjustment means include a plate having a shape substantially corresponding to the shape of said lateral face, said plate is coaxial with said roller, said plate is fixed in rotation around the longitudinal axis and relative to said roller, and said plate includes a housing configured to receive an end of said second link opposite said second actuator piston.

According to a particular aspect of the invention the system further includes second means for adjustment of the blade angle of said blades and said second adjustment means are configured to move said roller in translation along said longitudinal axis so as to modify the blade angle of all the blades of said propeller uniformly and simultaneously.

According to another particular aspect the system includes a casing and said second adjustment means include a third actuator including:

a third actuator chamber coaxial with said longitudinal axis and delimited by walls of said casing, and a third actuator piston formed by a portion of said transfer tube, said third actuator piston being received in said third actuator chamber and mobile in translation along the longitudinal axis in said third actuator chamber, and said roller is designed to be moved along the longitudinal axis during the movement of said third actuator piston.

The invention also proposes an aircraft including at least one propulsion system as described above.

BRIEF DESCRIPTION OF THE DRAWINGS

The features of the invention referred to hereinabove and others will become more clearly apparent on reading the following description of embodiments of the invention, said description being given with reference to the appended drawings, in which.

DETAILED DESCRIPTION OF THE PREFERRED EMBODIMENTS

Figure 1:
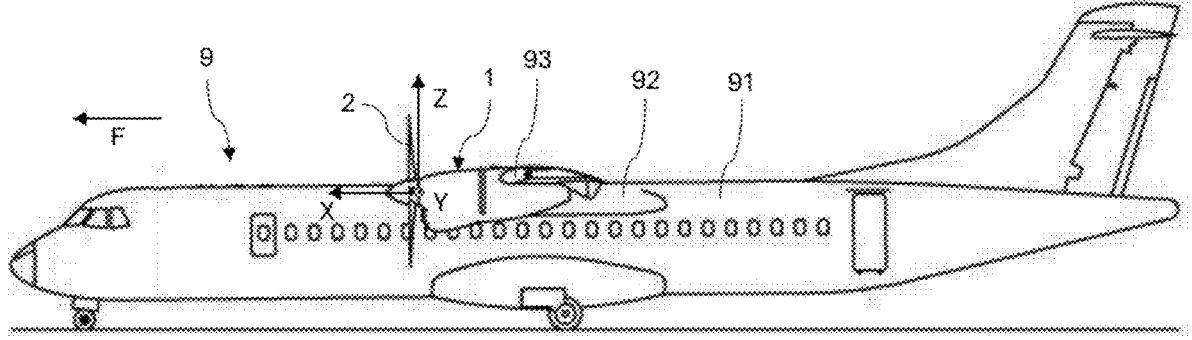
FIG. 1 is a side view of an aircraft employing an aircraft propulsion system according to the invention.

FIG. 1 shows an aircraft 9 that includes a fuselage 91 to each side of which is fixed a wing 92. At least one propulsion system 1 according to the invention is fixed below each wing 92 by means of a jet engine pylon 93.

In the following description terms relating to a position are referred to an aircraft in a normal position of flight, that is to say as represented in FIG. 1, and the "front" and "rear" positions relate to the front and the rear of the propulsion system 1 and are relative to the direction F of forward movement of the aircraft 9 when the propulsion system 1 is operating.

In the following description and by convention X denotes the longitudinal direction of the propulsion system, which is horizontal when the aircraft is on the ground, Y denotes the transverse direction, which is horizontal when the aircraft is on the ground, and Z denotes the vertical direction, which is vertical when the aircraft is on the ground, these three directions X, Y and Z being mutually orthogonal.

In the embodiments of the invention described here the propulsion system 1 takes the form of a combustion engine including a propeller 2 mounted on the drive shaft of the combustion engine. The propulsion system 1 has a vertical median plane XZ and a horizontal median plane XY.

As depicted in FIGS. 2 to 9 the propulsion system 1 (referred to hereinafter as the system) of the aircraft 9 has a longitudinal axis $A_1$ that extends globally parallel to the axis X. The system 1 includes a propeller 2 that is mobile in rotation about the longitudinal axis $A_1$ and includes a plurality of blades 20 each having a blade axis Ax extending globally perpendicular to the longitudinal axis $A_1$. The blade axis Ax is classically defined by a straight line passing through the root 201 of the blade and the tip (not depicted) of the blade and the blades 20 are distributed angularly around the longitudinal axis $A_1$.

According to the invention the system 1 includes first means 3 for adjustment of the blade angle of the blades 20 that are configured to modify the blade angle of each blade 20 as a function of its angular position around the longitudinal axis $A_1$ of the system 1. The blade angle of the blade is defined by its orientation relative to the blade axis Ax. The blade angle is therefore modified by pivoting the blade 20 around its blade axis Ax.

To this end the first adjustment means 3 include a globally tubular roller 30 globally coaxial with the longitudinal axis $A_1$. The roller 30 includes on an external surface 31 a housing 32a, 32b configured to receive the roots 201 of the blade 20. The housing 32a, 32b which, as described in more detail with reference to the various embodiments, can take the form of a groove or a plurality of notches extends globally in a first plane P1. The first plane P1 is at an angle $\alpha$ to a perpendicular plane PP perpendicular to a reference plane P0 that contains the longitudinal axis $A_1$. The first plane P1 is at a non-zero angle $\alpha$ between $-15°$ and $+15°$, in particular between $-5°$ and $+5°$, for example substantially equal to $-2°$ or $+2°$. To be more precise the reference plane P0 is a plane globally parallel to the vertical median plane XZ while the perpendicular plane PP is a plane globally parallel to the vertical plane YZ.

During rotation of the propeller 2 the inclination of the first plane P1 in which the housing 32a, 32b extends therefore enables modification of the blade angle of the blade 20 as a function of its angular position around the longitudinal axis $A_1$.

In this way the invention enables cyclic adjustment (that is to say adjustment that is repeated in each rotation of the propeller 2) of the blade angle of each blade 20 as a function of its angular position around the longitudinal axis $A_1$. For example, the blade angle of a blade 20 is different when the blade 20 is situated at 3 o'clock, 6 o'clock, 9 o'clock or 12 o'clock around the longitudinal axis $A_1$.

Such cyclic adjustment enables adaptation (that is to say variation) of the blade angle of the blades 20 during a complete rotation of the propeller 2 around the longitudinal axis $A_1$ so that the propeller 2 can supply an optimum thrust on the blades whatever the flight phase of the aircraft 9. Furthermore, such adjustment of the blade angle of the blades as a function of their angular position around the longitudinal axis $A_1$ enables a different blade angle to be imparted to the ascending blades and to the descending blades with the aim of adapting the load applied to each blade 20 of the propeller 2 and thus to reduce the impact of the distortion of the flow entering the front of the propeller during the take-off phase. This therefore enables great reduction of the noise generated by the propeller 2 during this flight phase.

Figure 2:
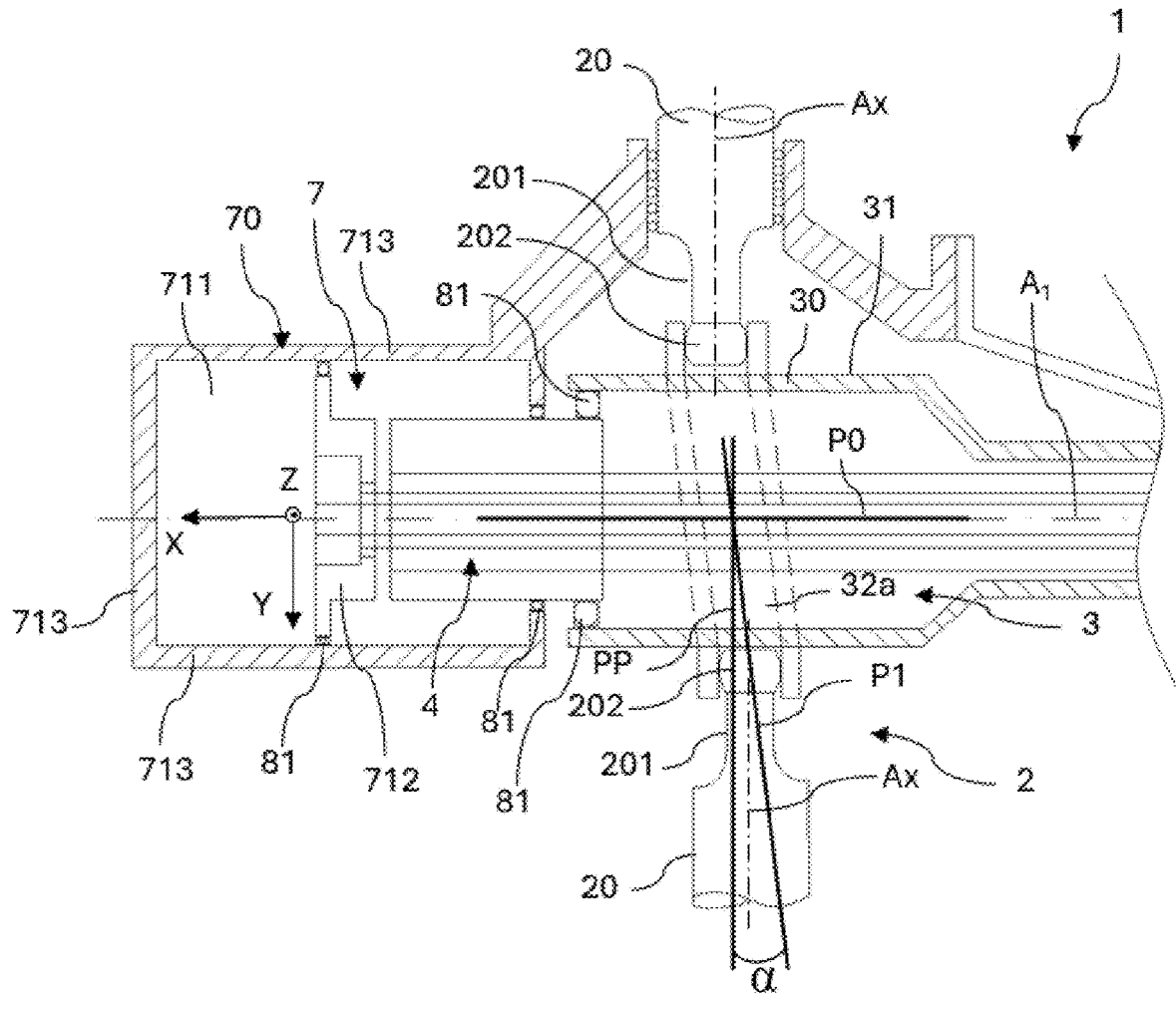
FIG. 2 is a side view in section of a propulsion system according to a first embodiment of the invention.

FIG. 2 is a view in section on the horizontal plane XY depicting a first embodiment of a system 1 according to the invention. In this first embodiment the roller 30 is fixed in rotation around the longitudinal axis $A_1$ and the housing 32a takes the form of a groove. The groove (housing 32a) is formed on the entire periphery of the roller 30 at the level of the exterior surface 31 and extends globally in the first plane P1. The roots 201 of the blades 20 are received in the groove (housing 32a) so that the blades 20 pivot around the roller 30 and around the longitudinal axis $A_1$. Furthermore, the angle $\alpha$ of the first plane P1 to the perpendicular plane PP is here fixed, non-zero and between $-15°$ and $+15°$, in particular between $-5°$ and $+5°$, for example substantially equal to $-2°$ or $+2°$. In the example depicted in FIG. 2 the angle $\alpha$ of the first plane P1 to the perpendicular plane PP is $5°$.

The blades 20 of the propeller 2 therefore turn around the roller 30 and their roots 201 move in the groove (housing 32a) of the roller 30 during rotation of the propeller 2. The groove (housing 32a) extends in the first plane P1, which is inclined at an angle $\alpha$ relative to the perpendicular plane PP so that the movement of the root 201 of the blade 20 in the groove (housing 32a) during a complete rotation of the propeller 2 around the longitudinal axis $A_1$ is not parallel to the perpendicular plane PP. Accordingly, as a function of the angular position of a blade 20 the root 201 of that blade 20 will find itself during the rotation of the propeller 2 aligned with the perpendicular plane PP and then offset to one side or the other of the perpendicular plane PP (as depicted in FIG. 2). This movement of the blade root 201 relative to the perpendicular plane PP generates a modification of the blade angle of the blades 20 during rotation of the propeller 2 around the longitudinal axis $A_1$.

In this embodiment the roller 30 is fixed in rotation relative to the axis Z. It is therefore the inclination of the groove (housing 32a) formed in the roller 30 that defines the angle $\alpha$ between the first plane P1 and the perpendicular plane PP. Depending on the required angle $\alpha$ it is therefore necessary to use a roller 30 having a corresponding groove (housing 32a). The angle $\alpha$ of the groove (housing 32a) (corresponding to the angle $\alpha$ of the first plane P1) to the perpendicular plane PP is selected to obtain optimum performance in terms of the thrust and the noise generated by the propeller 2.

In this example the groove (housing 32a) extends in a globally rectilinear manner and parallel to the first plane P1, although using a more complex groove could be envisaged, one having curved portions for example, so as to manage more complex blade load effects (wing effect, air entry effect, etc.).

Furthermore, and as depicted in FIG. 2, the system 1 further includes a casing 70 that in this example forms the hub of the propeller 2 and therefore carries the blades 20. The casing 70 turns around the longitudinal axis $A_1$ and therefore around the roller 30, which is fixed in rotation relative to the longitudinal axis $A_1$. The casing 70 can be driven in rotation by a gearbox (not depicted) of the propulsion system 1 for example.

Figure 3:
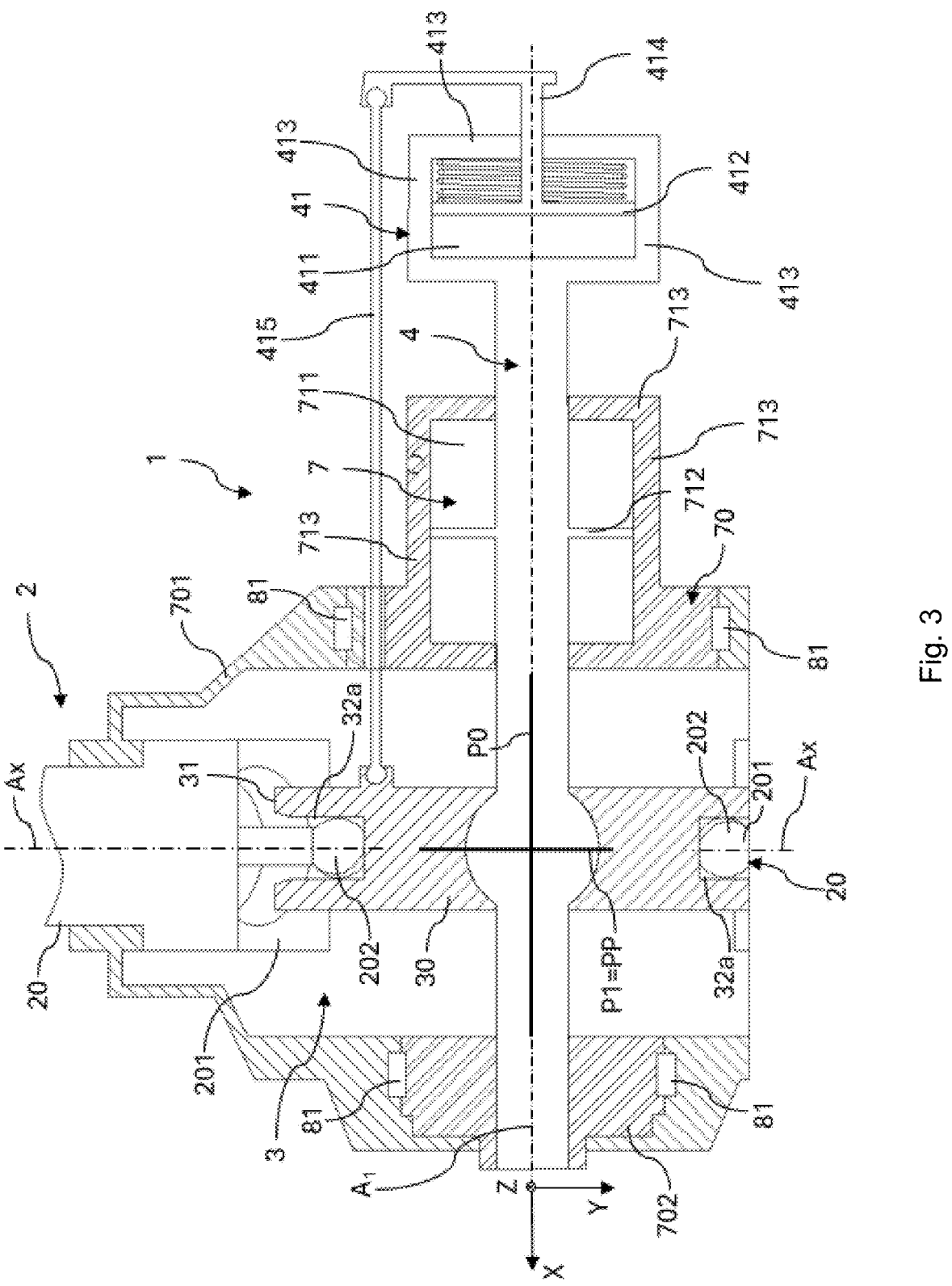
FIG. 3 is a side view in section of a propulsion system according to a second embodiment of the invention, the first adjustment means being in an initial position.
Figure 4:
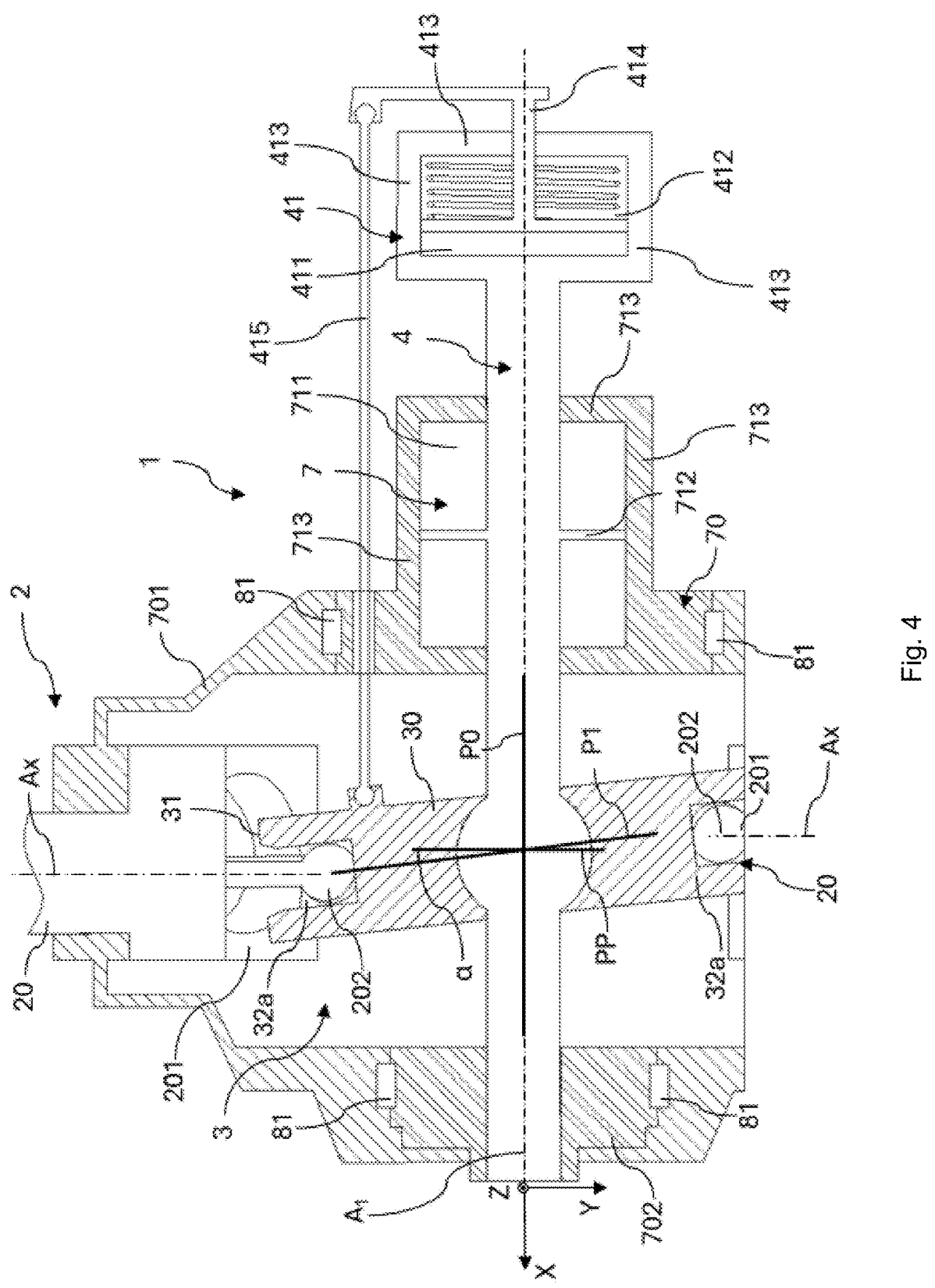
FIG. 4 is a side view in section of the propulsion system from FIG. 3, the first adjustment means being in a pivoted position.
Figure 5:
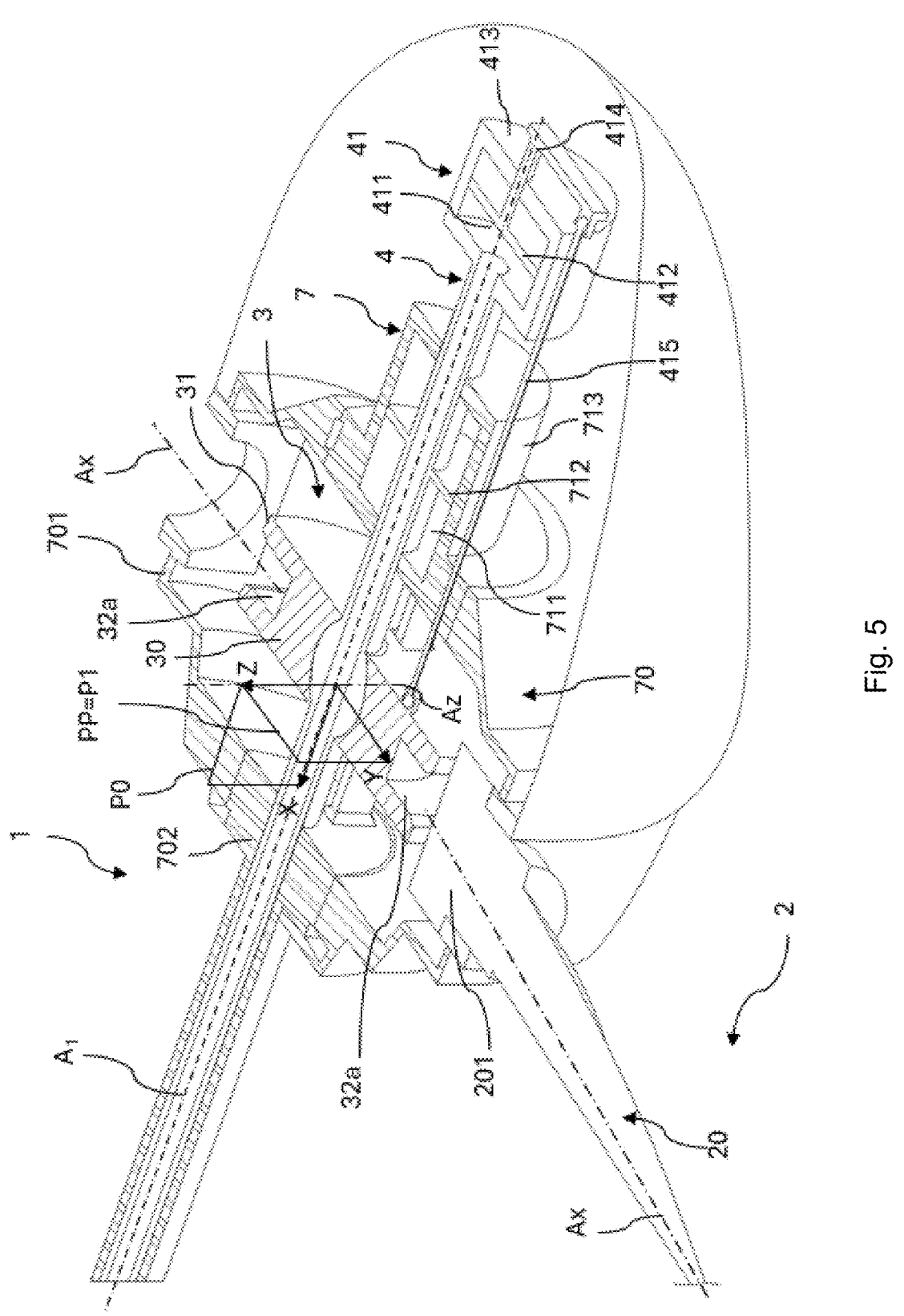
FIG. 5 is a perspective view in section of the propulsion system from FIG. 3.
Figure 6:
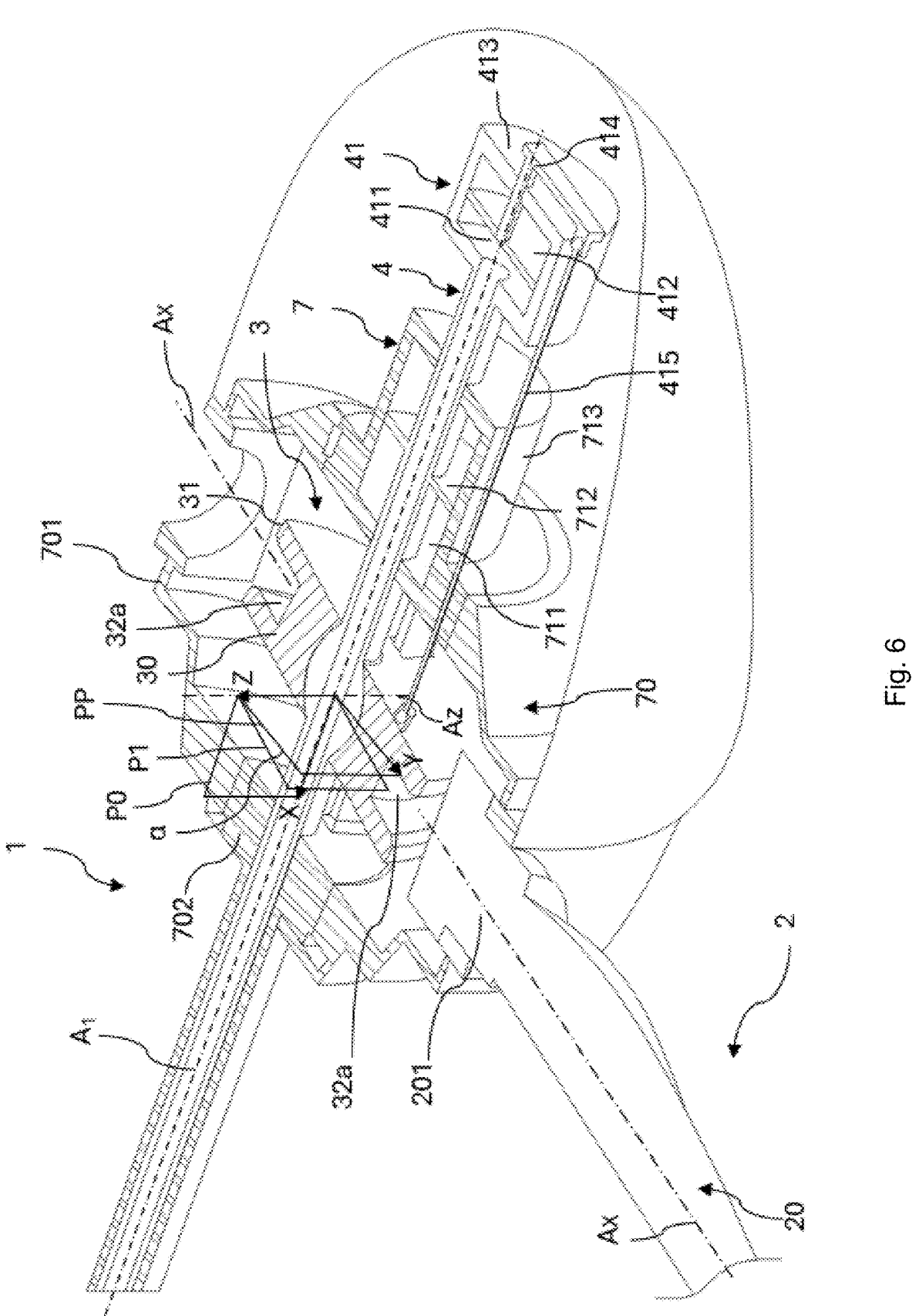
FIG. 6 is a perspective view in section of the propulsion system from FIG. 4.
Figure 7:
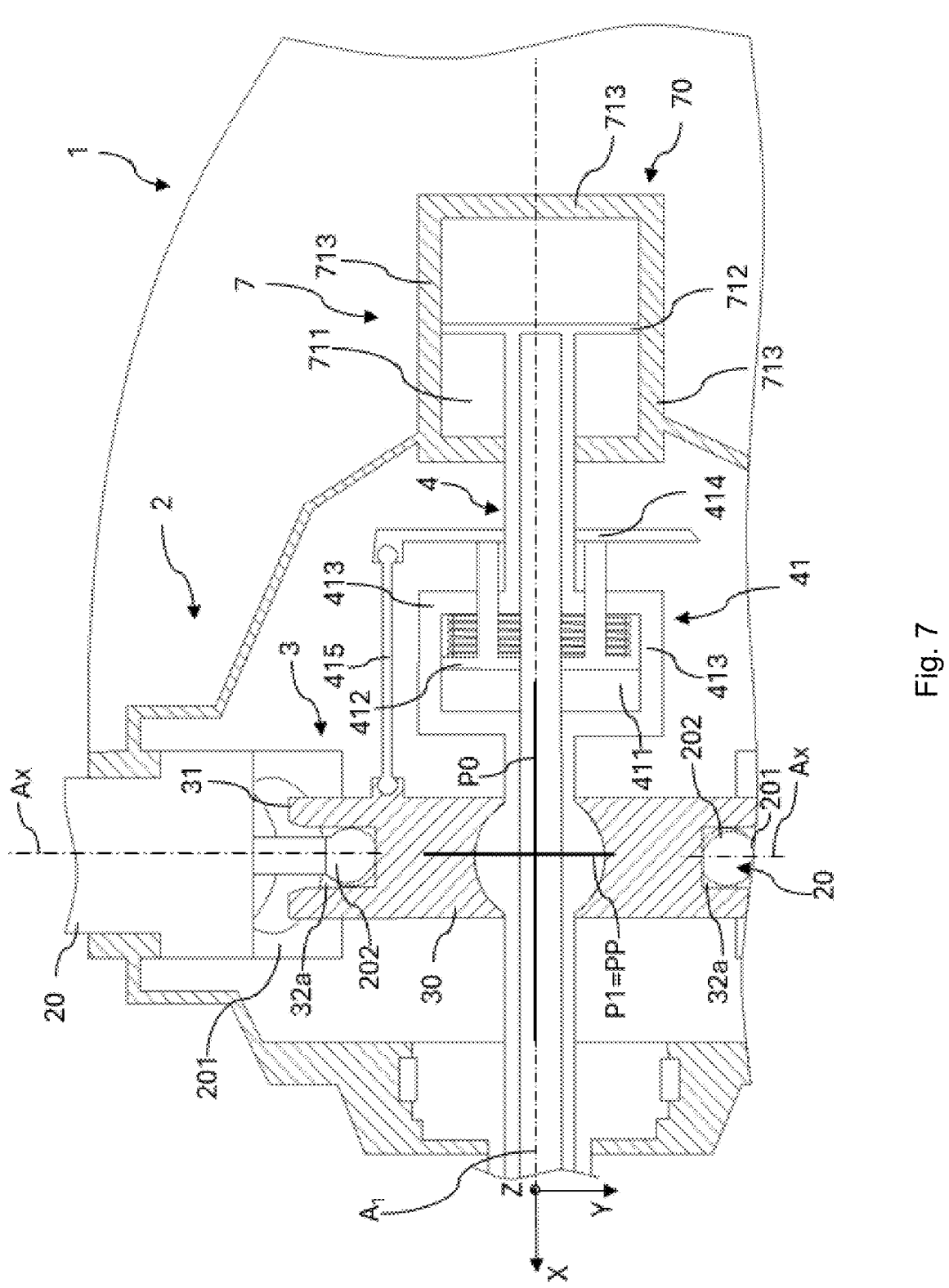
FIG. 7 is a side view in section of a variant of the propulsion system according to the second embodiment of the invention, the first adjustment means being in an initial position.

FIGS. 3 to 7 depict a second embodiment of the propulsion system 1 according to the invention. To be more precise, FIGS. 3 and 4 provide a view in section on the horizontal plane XY of the system 1 with the first adjustment means 3 respectively in an initial position and in a pivoted position. FIGS. 5 and 6 are a perspective view and a view in section on the horizontal plane XY of the system 1 with the first adjustment means 3 respectively in an initial position and in a pivoted position. FIG. 7 depicts a variant of the second embodiment.

In this second embodiment the roller 30 is fixed in rotation around the longitudinal axis $A_1$ and the housing 32a takes the form of a groove extending globally in the first plane P1. As before the groove (housing 32a) is formed over the entire periphery of the roller 30 at the level of the exterior surface 31 and extends globally in the first plane P1. The roots 201 of the blades 20 are received in the groove (housing 32a) so that during rotation of the propeller 2 the blades 20 pivot around the roller 30 and around the longitudinal axis $A_1$. The first adjustment means 3 are configured to modify the angle α of the first plane P1 to the perpendicular plane PP between −15° and +15°, in particular between −5° and +5°, for example substantially equal to −2° or +2°. To be more precise the first adjustment means 3 are mobile between an initial position (depicted in FIGS. 3 and 5) in which the angle α of the first plane P1 to the perpendicular plane PP is zero (which is to say in which the first plane P1 extends parallel to the perpendicular plane PP) and a pivoted position (depicted in FIGS. 4 and 6) in which the angle α of the first plane P1 to the perpendicular plane PP is non-zero and between −15° and +15°.

In other words the groove (housing 32a) extends in the first plane P1, which here is mobile (in this instance pivotable) via the first adjustment means 3 by an angle α relative to the perpendicular plane PP. When the first plane P1 is in a pivoted position the movement of a root 201 of a blade 20 in the groove (housing 32a) during a complete rotation of the propeller 2 around the longitudinal axis $A_1$ is therefore not parallel to the perpendicular plane PP. In this case, depending on the angular position of a blade 20, the root 201 of that blade 20 will find itself aligned with the perpendicular plane PP and then move to one side or the other of the perpendicular plane PP (as depicted in FIG. 4). This movement of the blade root 201 relative to the perpendicular plane PP generates a modification of the blade angle of the blade 20 during rotation of the propeller 2 around the longitudinal axis $A_1$.

In this way the first adjustment means 3 enable different adjustment of the blade angle of the blades 20 of a propeller 2 according to the flight phase of the aircraft. For example during the cruising phase the first adjustment means 3 can be placed in their initial position so that the blade angle is globally identical for all the blades 20. During the take-off phase of the aircraft 9 the first adjustment means 3 can be placed in a pivoted position in which the angle α of the first plane P1 to the perpendicular plane PP is non-zero and between −15° and +15°, in particular between −5° and +5°, for example substantially equal to −2° or +2°, so that the blade angle of a blade 20 varies as a function of its angular position, for example to limit the noise generated by the propeller 2.

In the present example the groove (housing 32a) extends in a globally rectilinear manner parallel to the first plane P1, although the use of a more complex groove (housing 32a) could be envisaged, for example one having curved portions, so as to manage more complex blade load effects (wing effect, air entry effect, etc.).

To enable the roller 30 to go from the initial position to the pivoted position (and vice versa) the first adjustment means 3 include a transfer tube 4 globally coaxial with the longitudinal axis $A_1$. The roller 30 is mounted on and mobile in rotation on the transfer tube 4 about a rotation axis Az (visible in FIGS. 5 and 6) perpendicular to the longitudinal axis $A_1$. To be more precise the rotation axis Az of the roller 30 is globally parallel to the vertical axis Z.

The transfer tube 4 includes a first actuator 41 that includes a first actuator chamber 411 delimited by walls 413 of the transfer tube 4 and a first actuator piston 412 received in the first actuator chamber 411 and mobile in translation along the longitudinal axis $A_1$ in the first actuator chamber 411. A free end 414 of the first actuator piston 412 is connected by a first link 415 to the roller 30 so as to cause the roller 30 to pivot relative to the transfer tube 4 about the rotation axis Az when the first actuator piston 412 is moved in the first actuator chamber 411. During movement of the first actuator piston 412 in the first actuator chamber 411 the roller 30 is pivoted around the rotation axis Az (by being pushed or pulled by the first link 415 depending on the direction of movement of the first actuator piston 412) so as to modify the angle α of the first plane P1 to the perpendicular plane PP.

In order to enable movement of the first actuator piston 412 in the first actuator chamber 411 the transfer tube 4 includes channels for feeding a fluid that feed the first actuator chamber 411. The first actuator 41 can be of the single-acting type and include a spring (as depicted here) or of the double-acting type (not depicted).

Furthermore, as depicted in FIGS. 3 to 6 the system 1 according to the second embodiment of the invention includes a casing 70 which in the present example includes a hub 701 that carries the blades 20 and a fixed chassis 702 that extends coaxially with the longitudinal axis $A_1$. The hub 701 is mobile in rotation around the fixed chassis 702 around the longitudinal axis $A_1$.

The hub 701 turns around the longitudinal axis $A_1$ and therefore around the roller 30. The hub 701 is for example driven in rotation by a gearbox (not depicted) of the propulsion system 1. In this example the walls 413 of the transfer tube 4 delimiting the first actuator chamber 411 are outside the casing 70. Only the first link 415 extends from the free end 414 of the first actuator piston 412 to the roller 30 situated inside the casing 70.

In a variant of this second embodiment depicted in FIG. 7 the system 1 also includes a casing 70 that in the present example forms a hub that carries the blades 20. The casing 70 turns around the longitudinal axis $A_1$ and therefore around the transfer tube 4 and the roller 30, which are fixed in rotation relative to the longitudinal axis $A_1$. In this variant there is no fixed chassis and the walls 413 of the transfer tube 4 delimiting the first actuator chamber 411 are disposed in the casing 70, which simplifies the structure of the system 1 since it is no longer necessary for the first link 415 to pass through a fixed chassis or to make a connection between a fixed chassis and the hub enabling rotation of the hub around the fixed chassis.

Figure 8:
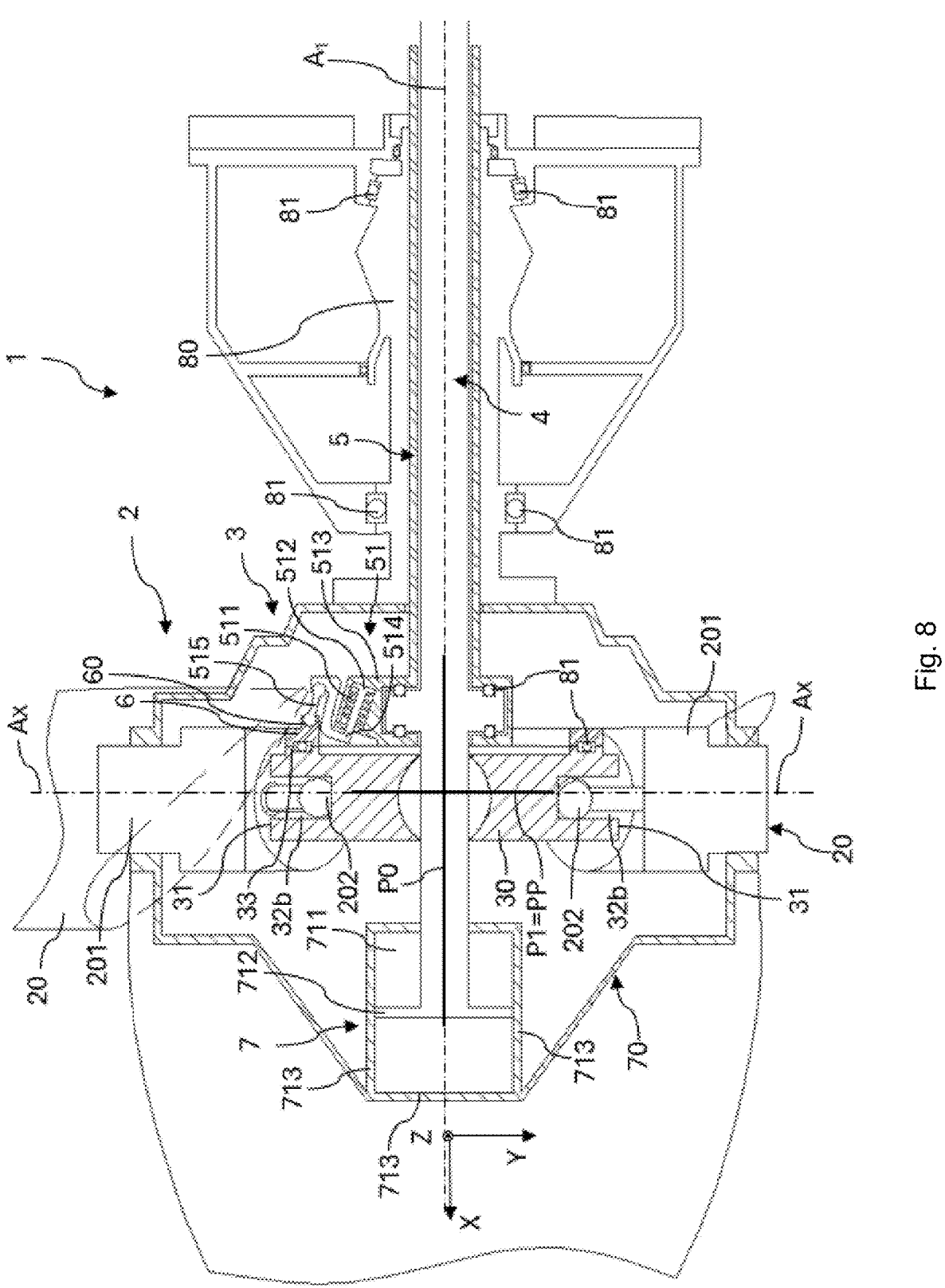
FIG. 8 is a side view in section of a propulsion system according to a third embodiment of the invention, the first adjustment means being in an initial position.
Figure 9:
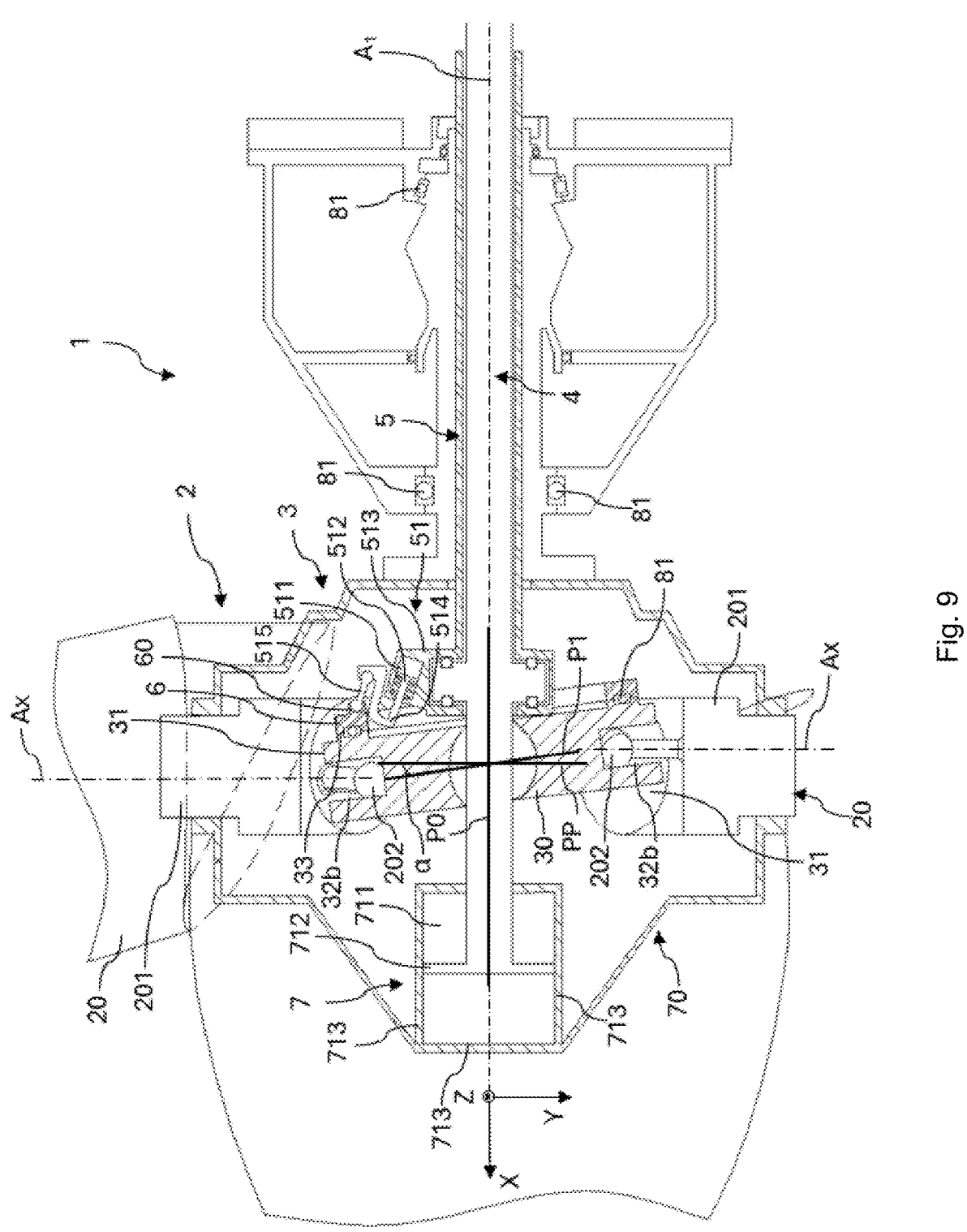
FIG. 9 is a side view in section of the propulsion system from FIG. 8, the first adjustment means being in a pivoted position.

FIGS. 8 and 9 depict a third embodiment of the propulsion system 1 according to the invention. To be more precise FIGS. 8 and 9 depict a view in section on the horizontal plane XY of the system 1 with the first adjustment means 3 respectively in an initial position and in a pivoted position.

In this third embodiment the roller 30 is mobile in rotation around the longitudinal axis $A_1$ and the housing 32b takes the form of a plurality of notches forming individual housings arranged at the level of the exterior surface 31 of the roller 30 and extending globally in the first plane P1. The root 201 of each blade 20 is therefore received in one of the notches (housing 32b) so that the blades 20 pivot with the roller 30 about the longitudinal axis $A_1$. In other words the roller 30 turns with the blades 20 around the longitudinal axis $A_1$ during rotation of the propeller 2.

The first adjustment means 3 are configured to modify the angle α of the first plane P1 to the perpendicular plane PP between −15° and +15°, in particular between −5° and +5°, for example substantially equal to −2° or +2°. As before the first adjustment means 3 are mobile between an initial position (depicted in FIG. 8) in which the angle α of the first plane P1 to the perpendicular plane PP is equal to zero (which is to say that the first plane P1 extends parallel to the perpendicular plane PP) and a pivoted position (depicted in FIG. 9) in which the angle α of the first plane P1 to the perpendicular plane PP is non-zero and between −15° and +15°.

In other words, the notches (housing 32b) extend in the first plane P1, which here is mobile (in this instance pivotable) by the first adjustment means 3 by an angle α relative to the perpendicular plane PP. When the first plane P1 is in a pivoted position the movement of a root 201 of a blade 20 in a notch (housing 32$b$) during a complete rotation of the propeller 2 around the longitudinal axis A$_1$ is therefore not parallel to the perpendicular plane PP. In this case, depending on the angular position of a blade 20, the root 201 of that blade 20 will find itself aligned with the perpendicular plane PP and then moved to one side or the other of the perpendicular plane PP (as depicted in FIG. 4). This movement of the blade root 201 relative to the perpendicular plane PP generates a modification of the blade angle of the blade 20 during rotation of the propeller 2 around the longitudinal axis A$_1$.

In this way the first adjustment means 3 enable different adjustment of the blade angle of the blades 20 of a propeller 2 during the flight phase of the aircraft. During the cruising phase for example the first adjustment means 3 can be placed in their initial position so that the blade angle is globally identical for all the blades. During the take-off phase of the aircraft 9 the first adjustment means 3 can be placed in a pivoted position in which the angle α of the first plane P1 to the perpendicular plane PP is non-zero and between −15° and +15°, in particular between −5° and +5°, for example substantially equal to −2° or +2°, so that the blade angle of a blade 20 varies as a function of its angular position to limit the noise generated by the propeller 2 for example.

The first adjustment means 3 include a transfer tube 4 mobile in rotation around the longitudinal axis A$_1$. The roller 30 is mobile in rotation around the longitudinal axis A$_1$ and mounted on and mobile in rotation on the transfer tube 4 around a rotation axis Az perpendicular to the longitudinal axis A$_1$. To be more precise the rotation axis Az of the roller 30 is globally parallel to the vertical axis Z.

The first adjustment means 3 further include an auxiliary transfer tube 5 fixed in rotation relative to the longitudinal axis A$_1$ and coaxial with the transfer tube 4. To be more precise, the transfer tube 4 is mobile in rotation around the longitudinal axis A$_1$ inside the auxiliary transfer tube 5.

In other words the first adjustment means 3 include an auxiliary transfer tube 5 which is coaxial with the longitudinal axis A$_1$ and fixed in rotation relative to the latter. The transfer tube 4 is mounted inside the auxiliary transfer tube 5 and is mobile in rotation around the longitudinal axis A$_1$. The transfer tube 4, the roller 30 and the blades 20 therefore rotate together around the longitudinal axis A$_1$.

So as to allow the roller 30 to go from the initial position to the pivoted position (and vice versa) the auxiliary transfer tube 5 includes a second actuator 51 including a second actuator chamber 511 delimited by walls 513 of the auxiliary transfer tube 5 and a second actuator piston 512 received in the second actuator chamber 511 and mobile in translation in the second actuator chamber 511. A free end 514 of the second actuator piston 512 is rigidly fixed by a second link 515 to the roller 30 so as to cause the roller 30 to pivot relative to the transfer tube 4 around the rotation axis Az and to modify the angle α of the first plane P1 to the perpendicular plane PP.

Accordingly, during movement of the second actuator piston 512 in the second actuator chamber 511 the roller 30 is pivoted (by being pushed or pulled by the second link 515, depending on the direction of movement of the second actuator piston 512) so as to modify the angle α of the first plane P1 to the perpendicular plane PP.

In order to enable movement of the second actuator piston 512 in the second actuator chamber 511 the transfer tube 4 and the auxiliary transfer tube 5 include channels for feeding a fluid that feed the second actuator chamber 511. The second actuator 51 can be of single-acting type and include a spring (as depicted here) or of the double-acting type (not depicted).

The auxiliary transfer tube 5 being fixed relative to the longitudinal axis A$_1$ and the roller 30 being mobile around the longitudinal axis A$_1$, it is necessary to provide an appropriate connection between these two elements. To this end the roller 30 has a lateral face 33 globally parallel to the first plane P1. The first adjustment means 3 further include a plate 6 having a shape substantially corresponding to the shape of the lateral face 33. The plate 6 is coaxial with the roller 30. Furthermore, the plate 6 is fixed in rotation around the longitudinal axis A$_1$ and relative to the roller 30. Finally, the plate 6 includes a housing 60 configured to receive an end of the second link 515 opposite the second actuator piston 512.

In this way the plate 6 can therefore pivot with the roller 30 around the rotation Az of the roller 30. The roller 30 can therefore rotate freely relative to the auxiliary transfer tube 5 and the second link 515 can cause the roller 30 to pivot around the rotation axis Az by pushing or pulling on the plate 6, which is rigidly connected to the roller 30.

This third embodiment therefore provides an alternative to the solutions described above in which the roller 30 rotates with the blades 20 of the propeller 2.

Furthermore, as depicted in FIGS. 8 and 9 the system 1 further includes a casing 70 that in the present example forms the hub of the propeller 2 and therefore carries the blades 20. The casing 70 rotates around the longitudinal axis A$_1$ with the roller 30 and the transfer tube 4. Here the casing 70 is driven in rotation by a main shaft 80 connected for example to a gearbox (not depicted) of the propulsion system 1.

In a manner compatible with all the embodiments described above the propulsion system 1 of the invention further includes second means 7 for adjustment of the blade angle of the blades 20 configured to move the roller 30 in translation along the longitudinal axis A$_1$ so as to define the blade angle of all the blades 20 of the propeller 2 uniformly and simultaneously.

Thus the invention can (via the second adjustment means 7) combine uniform and simultaneous adjustment of all the blades 20 and an additional individual adjustment (via the first adjustment means 3) of the blade angle of each blade as a function of its angular position around the longitudinal axis A$_1$. In other words the invention provides an additional adjustment of the blade angle of the blades 20 so as to optimize on the one hand the performance of the propulsion system 1 and on the other hand the noise generated during a complete flight phase of the aircraft.

In order to move the rollers 30 in translation along the longitudinal axis A$_1$ the system 1 includes a casing 70 and the second adjustment means 7 include a third actuator 71. The third actuator 71 includes in particular:

a third actuator chamber 711 extending coaxially with the longitudinal axis A$_1$ and delimited by third walls 713 of the casing 70, and a third actuator piston 712 formed by a portion of the transfer tube 4, the third actuator piston 712 being received in the third actuator chamber 711 and mobile in translation along the longitudinal axis A$_1$ in the third actuator chamber 711.

The roller 30 is therefore designed to be moved along the longitudinal axis A$_1$ during movement of the third actuator piston 712. Accordingly, during movement of the third actuator piston 712 in the third actuator chamber 711 the roller 30 is moved in translation (forward or backward) along the longitudinal axis $A_1$. Such movement of the roller 30 along the longitudinal axis $A_1$ enables modification of the position of the roots 201 of the blades 20 of the propeller 2 so as to modify the blade angle of the blades.

In order to enable movement of the third actuator piston 712 in the third actuator chamber 711 the transfer tube 4 includes channels feeding a fluid that feed the third actuator chamber 711. The third actuator 71 can be of the double-acting type (as depicted here) or of the single-acting type (not depicted).

In the first, third and second embodiments described above (and the variant described with reference to FIG. 7) wherein the casing 70 forms the hub of the propeller 2 the third chambers 711 are formed in the casing 70. The hub therefore rotates around the longitudinal axis $A_1$.

In the second embodiment (and the variant described with reference to FIGS. 3 to 6) the third walls 713 of the casing 70 are formed in the fixed chassis 702, which does not rotate around the longitudinal axis $A_1$.

In the second and third embodiments described above the connection between the roller 30 and the transfer tube 4 preferably takes the form of a ball-joint connection so as to limit friction between the roller 30 and the transfer tube 4.

Regardless of the embodiment of the invention each of the roots 201 of the blades 20 preferably carries a pin 202 designed to be received in the housing 32*a*, 32*b* of the roller 30. In the examples depicted and in order to limit friction between the blades 20 and the housing 32*a*, 32*b* of the roller 30 the pin 202 has a substantially circular shape. The use of a lubricant to limit friction between the blades 20 and the housing 32*a*, 32*b* of the roller 30 can also be envisaged.

So as to limit friction and thereby increase the efficiency of the propulsion system 1 bearing mechanisms 81 are preferably used between the parts that rotate relative to one another, for example between the fixed chassis 702 and the hub 701 or between the plate 6 and the roller 30.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A propulsion system for an aircraft comprising:
a propeller mobile in rotation around a longitudinal axis, said propeller including a plurality of blades each having a blade axis globally perpendicular to the longitudinal axis, said blades of the plurality of blades being distributed angularly relative to said longitudinal axis; and
first means for adjustment of a blade angle of said blades of the plurality of blades, said first adjustment means configured to modify the blade angle of each blade of the plurality of blades as a function of an angular position of each said blade of the plurality of blades around said longitudinal axis, wherein said first adjustment means include a globally tubular roller coaxial with said longitudinal axis, said globally tubular roller including on an external surface a housing configured to receive respective roots of said blades of the plurality of blades, said housing extending in a first plane having a non-zero angle ($\alpha$) of which relative to a plane perpendicular to a reference plane containing said longitudinal axis is between $-15°$ and $+15°$.

2. The system as claimed in claim 1, wherein said globally tubular roller is fixed in rotation around said longitudinal axis and said housing comprises a groove extending globally in said first plane, said roots of said blades of the plurality of blades are received in said groove so that said blades of the plurality of blades pivot around said roller and around said longitudinal axis, and the non-zero angle ($\alpha$) of said first plane relative to said perpendicular plane is fixed, non-zero and between $-15°$ and $+15°$.

3. The system as claimed in claim 1, wherein said globally tubular roller is fixed in rotation around said longitudinal axis and said housing comprises a groove extending globally in said first plane, said roots of said blades of the plurality of blades are received in said groove so that said blades of the plurality of blades pivot around said roller and around said longitudinal axis, and
wherein said first adjustment means are configured to modify the non-zero angle ($\alpha$) of said first plane relative to said perpendicular plane between $-15°$ and $+15°$.

4. The system as claimed in claim 3, wherein said first adjustment means include a transfer tube globally coaxial with said longitudinal axis, said globally tubular roller is mounted on and mobile in rotation on said transfer tube around a rotation axis perpendicular to said longitudinal axis,
wherein said transfer tube includes a first actuator including a first actuator chamber delimited by walls of said transfer tube and a first actuator piston received in said first actuator chamber and mobile in translation along said longitudinal axis in said first actuator chamber, and a free end of said first actuator piston connects, by a first link, to said globally tubular roller so as to cause said globally tubular roller to pivot relative to said transfer tube around said rotation axis and to modify the non-zero angle ($\alpha$) of said first plane relative to said perpendicular plane.

5. The system according to claim 1, wherein said globally tubular roller is mobile in rotation around said longitudinal axis and said housing comprises a plurality of individual housings extending globally in said first plane,
wherein a root of each blade of the plurality of blades is received in one of said housings so that said blades of the plurality of blades pivot with said roller around said longitudinal axis, and
wherein said first adjustment means are configured to modify the non-zero angle ($\alpha$) of said first plane relative to said perpendicular plane between $-15°$ and $+15°$.

6. The system as claimed in claim 5, wherein said first adjustment means include a transfer tube mobile in rotation around said longitudinal axis, said globally tubular roller is mobile in rotation around said longitudinal axis and mobile in rotation on said transfer tube around a rotation axis perpendicular to said longitudinal axis,
wherein said first adjustment means further include an auxiliary transfer tube fixed in rotation relative to said longitudinal axis and extending coaxially with said transfer tube, said transfer tube mobile in rotation around said longitudinal axis inside said auxiliary transfer tube, wherein said auxiliary transfer tube includes a second actuator including a second actuator chamber delimited by walls of said auxiliary transfer tube and a second actuator piston received in said second actuator chamber and mobile in translation in said second actuator chamber, and wherein a free end of said second actuator piston connects, by a second link, to said globally tubular roller so as to cause said globally tubular roller to pivot relative to said transfer tube around said rotation axis and to modify the angle ($\alpha$) of said first plane relative to said perpendicular plane.

7. The system as claimed in claim 6, wherein said globally tubular roller has a lateral face extending globally parallel to said first plane, wherein said first adjustment means include a plate having a shape substantially corresponding to a shape of said lateral face, said plate mounted coaxially with said globally tubular roller, wherein said plate is fixed in rotation about the longitudinal axis and relative to said globally tubular roller, and wherein said plate includes a housing configured to receive an end of said second link opposite said second actuator piston.

8. The system as claimed in claim 1, further comprising:

second means for adjustment of the blade angle of said blades of the plurality of blades, said second adjustment means configured to move said globally tubular roller in translation along said longitudinal axis so as to modify, uniformly and simultaneously, the blade angle of all the blades of the plurality of blades of said propeller.

9. The system as claimed in claim 8, further comprising:

a casing, wherein said second adjustment means include a third actuator including:

a third actuator chamber coaxial with said longitudinal axis and delimited by walls of said casing, and a third actuator piston formed by a portion of said transfer tube, said third actuator piston received in said third actuator chamber and mobile in translation along the longitudinal axis in said third actuator chamber, said globally tubular roller configured to move along the longitudinal axis during a movement of said third actuator piston.

10. An aircraft comprising:

at least one propulsion system as claimed in claim 1.

* * * * *